June 29, 1965 S. R. G. BURGESS ETAL 3,191,338
CONVERTIBLE AND NESTING COMMERCIAL CRAB TRAP
Filed Dec. 20, 1961 3 Sheets-Sheet 1

STANLEY R. G. BURGESS
ROY C. FURFIORD
INVENTORS

BY

*clarence M. Tuck*

ATTORNEY

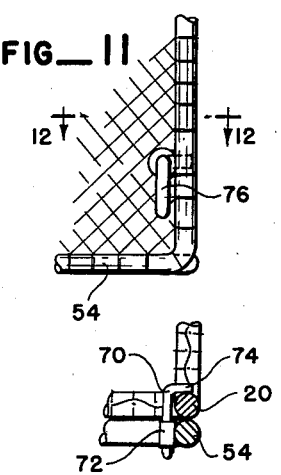
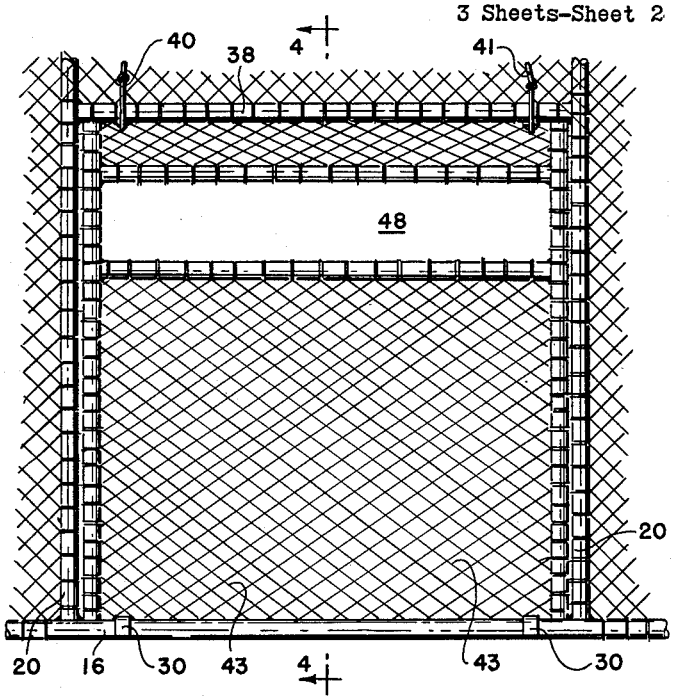
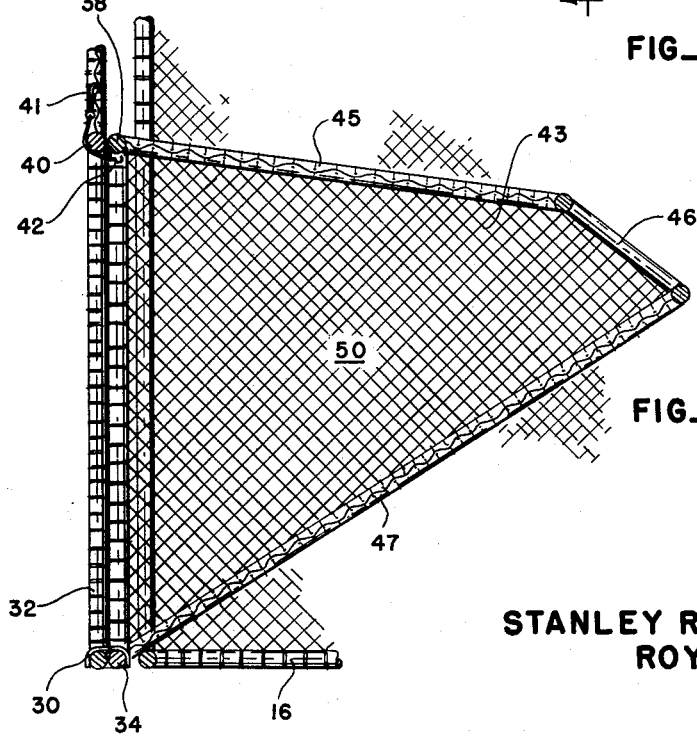

June 29, 1965  S. R. G. BURGESS ETAL  3,191,338
CONVERTIBLE AND NESTING COMMERCIAL CRAB TRAP
Filed Dec. 20, 1961  3 Sheets-Sheet 3
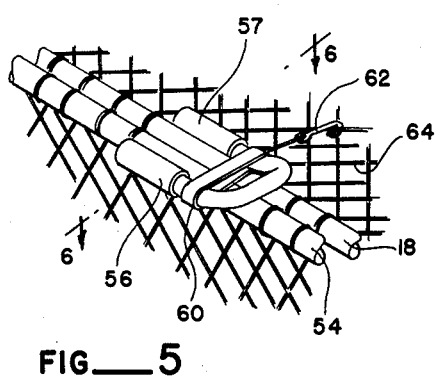
FIG—5
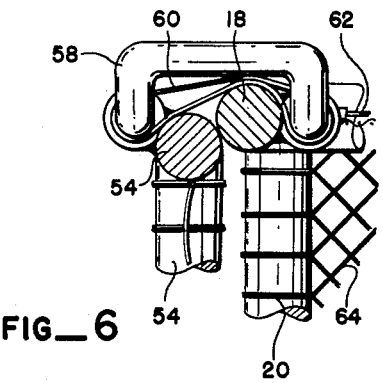
FIG—6
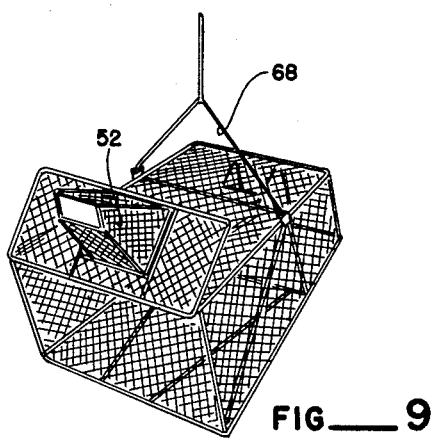
FIG—9
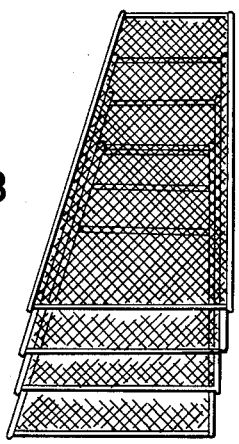
FIG—8
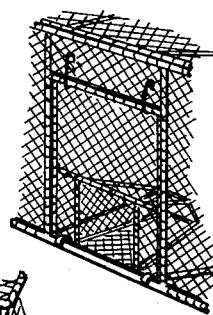
FIG—10
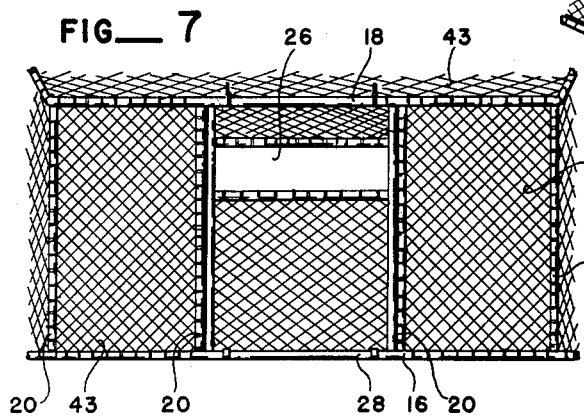
FIG—7
STANLEY R. G. BURGESS
ROY C. FURFIORD
*INVENTORS*
BY
*Clarence M. Tuck*
ATTORNEY

United States Patent Office 3,191,338
Patented June 29, 1965

3,191,338
CONVERTIBLE AND NESTING COMMERCIAL CRAB TRAP
Stanley R. G. Burgess, 610 W. 1st, Aberdeen, Wash., and Roy C. Furfiord, Box 245, Westport, Wash.
Filed Dec. 20, 1961, Ser. No. 160,791
2 Claims. (Cl. 43—102)

This present invention relates to the general art of crab traps and more particularly to the type of crab trap used by the commercial fisherman in the taking of the dungeness type crab and also for trapping the large king crabs. Provision is made for the easy substitution of the tunnel arrangements so that the traps can be easily converted for fishing for the dungeness crab type or the king crab type. Further, means are provided for the nesting of the crab traps the bulk of which has heretofore been a limitation on the number of traps that could be safely carried aboard a fishing boat.

The commercial crab fisherman is now finding it necessary to go to more distant areas for an adequate supply of either the smaller dungeness type crab or the so-called Alaska king crab. This change in the location of the large bodies of crabs, due to excessive local fishing, has required the employment of full powered and expensive seagoing fishing boats. The use of these boats makes it necessary for a fisherman to realize a very substantial income from his fishing enterprise if he is to be able to amortize the cost of his boat, his operational expenses and pay his own wages. In the past it has been customary to use relatively large crab traps, either of circular form or flat rectangular form, often square in top view and in order to have these of adequate strength they were difficult to nest in any particular manner. In this present trap we have modified the form to an elongated one in which the two verticle sides and the top converge from one end to the other, thus producing a tapering unit which permits the nesting of a large number of the same. In any nesting arrangements it is not possible to completely place one of the traps entirely inside another. It is generally felt that by using our present trap arrangements a boat can carry two and one half times as many traps in going to and from the fishing ground as was previously possible. This same nesting or dovetailing feature greatly reduces the freight on traps as they are transported from a place of manufacture to a place adjacent the fishing grounds where they can be picked up by the fishing boats. Bulky items are normally carried by seaborne freight boats on the basis of bulk and it is therefore found that by using our type of trap the freight is only about one third of the cost which would be spent for the non-nesting types of crab traps.

In order to facilitate the nesting of the traps provision must be made for the easy removal of the large end closure which closures themselves are then individually stacked together and thus effecting the greatest reduction in overall bulk. Other forms of partial nesting that still effects a very considerable saving in bulk can be achieved by merely opening the large end portion and swinging it up on its hinges so that, in effect, a number of the closure members with their appropriate tunnels can be nested together without being actually entirely removed from the body of the trap.

Much of the fishing for king crab is done in either fully or partially exposed waters which often restricts the fishing time and consequently the fisherman may desire to move to an area where the smaller dungeness crab can be taken and this of course requires a modification of the entrance tunnels, of which there are preferably two in all forms of our traps.

The principal object of our present invention, therefore is to provide a commercial crab trap which can be telescoped with traps of a similar size and type and the nesting arrangement thus provided thereby greatly reduces the over-all bulk of a given number of traps.

A further object of our invention is to provide crab entry tunnels which are removable in order to facilitate the most complete nesting of the equipment and more especially to provide the ability to convert the trap so that it can be used to fish the dungeness or the king crab types with no modification except to change the tunnels which must be a type and conformation to best insure the entering and trapping of the desired type of crabs.

A further object of this invention is to provide a hinged door which is located at the large end of the tapering trap and which is normally provided with a tunnel as noted, which is removable so that convertibility to other types of fishing will be possible.

A further object of this invention is to provide a means for the door closure member of the trap which will permit the hinging of the door throughout three quarters of a circle and thus greatly expedite the unloading of the traps when they are raised for that purpose.

A further object of this invention is to provide the hinged door with a locking means that will insure that the door will not be opened during the raising of the trap and yet will be easily operated when the trap is in position for unloading the crabs.

A further and general purpose of this invention is to provide means whereby a greatly increased number of traps can be carried conveniently on a crab fishing boat.

A further general object is to provide a telescoping or nesting of the crab trap parts so that the bulk can be greatly reduced and economically stacked when it is desired to ship the same by rail or other transportation means.

Further objects, advantages and capabilities will be apparent from the disclosure in this specification and drawings or may be comprehended or are inherent in the device.

In the drawings:

FIGURE 3 is an enlarged fragmentary view illustrating one form of tunnel used in our crab trap and illustrating the means by which it is secured in operational position.

FIGURE 4 is an enlarged vertical cross sectional view on the same scale as FIGURE 3 and illustrating the satisfactory means by which the tunnel may be secured in operational position.

FIGURE 5 is a fragmentary view on an increased scale illustrating a type of hinge suitable for hingedly securing the door or closure member so that it may swing through a wide arc and at the same time permit the sufficient vertical movement of the door so as to disengage it from its bottom securing means.

FIGURE 6 is a vertical cross sectional view taken along the line 6—6 of FIGURE 5 and illustrating more fully the construction thereof.

FIGURE 7 is an end elevation showing the smaller end of our trap and further illustrating the removable entry tunnel.

FIGURE 8 is a simplified view with certain parts not illustrated but showing the general manner in which the crab traps admit of being telescoped or nested together thereby obtaining an appreciable saving of bulk.

FIGURE 9 is an illustration of the general position in which the two portions of our crab trap are hinged together and illustrating the bridle used to facilitate the unloading of the crabs by simply having the bottom inclined and thus being able to pour the crabs out of the trap.

FIGURE 10 is a fragmentary view illustrating one form of tunnel from the larger or door end of our trap.

FIGURE 11 is a fragmentary view illustrating the locking means employed to insure that the door of the trap will not open until it is desired to unload the trap after the showing of FIGURE 9.

FIGURE 12 is a cross-sectional view taken along the line 12—12 of FIGURE 11.

Figure 1:
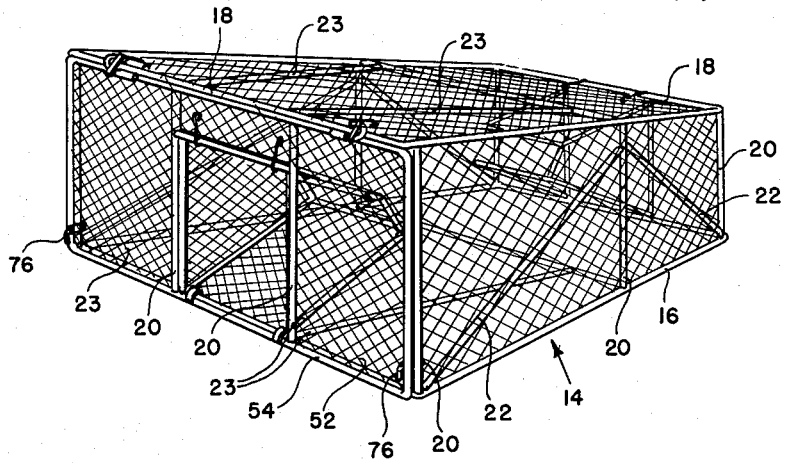
FIGURE 1 is a perspective view illustrating one form of our crab trap and showing the position assumed when fishing for crabs.

Referring to the drawings, throughout which like reference characters indicate like parts the numeral 14 generally designates the main body or pot of our crab trap. The size of the pot will of course determine the size and strength of the structural members used and these may be made of any suitable metal. As an example of proportion, we have the large end with a height of 40 inches and a width of 72 inches and spaced 72 inches from this a parallel disposed small end having a height of 26 inches and a width of 60 inches. We have found that 7/8" steel rod makes a very suitable frame for this size in that it is resilient to a degree in case of entanglement on a rocky bottom and it also has the strength required to carry the loading of a full trap of crabs as it is raised from the water to an appropriate point for unloading. Using 7/8 inch solid rod for the main framing we prefer to bend the same around the corners and to then weld the abutting ends. This construction is employed on the bottom horizontal frame 16 and the top inclined frame 18. Both top and bottom frames are substantially trapezoidal in shape having parallel ends, one wider than the other, with substantially the same center line so the sides taper inwardly from the wider end to the narrower end. A plurality of vertically disposed rods 20 secures the two frames 16 and 18 in spaced relationship and these are preferably welded in place. In order to prevent wracking of the pot appropriate diagonal bracing members 22 are employed in the sides and ends. For the same reasons the top and bottom frames are additionally reinforced as required preferably by diagonally positioned struts 23 which are welded in place. It will be noted in FIGURES 1 and 2 that the point of attachment of the maneuvering and unloading bridle 68, which is secured at 24 on each side of the pot, is particularly well braced so as to distribute the strain due to a heavy load of crab throughout the framework. Suitable mesh material as 43 is secured to the main body of the crab trap. Said main body or pot is composed of the bottom and top frames, the side walls and the end members exclusive of the entrance tunnel openings.

Figure 2:
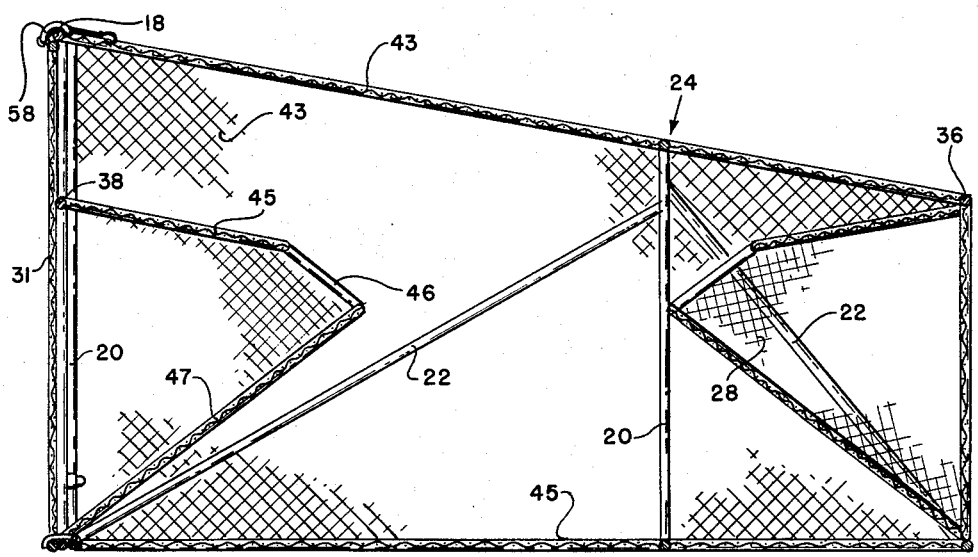
FIGURE 2 is a longitudinal vertical sectional view through the trap illustrating the general framing of the same and the positioning of the tunnels.

Welded to the spaced frames 16 and 18 are inner struts 20 for framing the opening of the removable tunnel 26. The lower frame piece 28 of the tunnel 26 is secured to the pot in the same manner as the tunnel of the large or locked end of the pot and this is illustrated in FIGURE 4 wherein a U-shaped clip 30 is employed to partially encircle the bottom frame door closure member 32 and the framework 34 of the tunnel 26. Preferably the same size tunnel is used on both ends of the trap, as their basic use requirements are the same and maintaining the same size is economical for manufacture and when the traps are partially dis-assembled for the maximum nesting the tunnels can be picked up without selection because they all interchange. Referring again to FIGURE 2, as shown, the one tunnel in the small end may be fixedly secured as by having the frame member 36 be actually a portion of the upper large frame 18. An alternate structure is shown in FIGURE 4 in which the tunnel has its own upper frame member as 38 and a rubber or other resilient link 40 connecting the two hooks as 41 and 42 may be employed to sufficiently encircle the two frame members so as to hold the tunnel in place. Referring to FIGURE 2 it will be noted that one tunnel is fixedly secured in place as part of the pot structure and the other one is removable. The clearest showing of the removable tunnel is in FIGURES 3 and 4. In both of these views it will be noted that the three structural members that extend into the pot, members 45, 46 and 47, all converge toward a median so that they can be nested with other tunnels. It will be noted that the tunnel is covered on the top by a mesh material which is supported by two space bars 45, on the sides and on the bottom which is supported by two space members 47. The mesh 43 employed is preferably stainless steel. The members 46 frame the opening 48 which is provided so that crabs entering the trap are directed largely by the lower surface 28 upwardly. When they pass through the opening 48 they then have considerable distance between the inner end of the tunnel and the bottom of the pot which is framed by member 16 which experience shows, leaves little likelihood of the crab finding its way out again. The spaced sides 50 of the tunnel are shown in FIGURES 3 and 4 as being parallel. In the showing however, of FIGURE 9 the tunnel itself is shown with these two sides designated by the reference characters 52 as being inclined towards a median line through the tunnel making nesting of the tunnel members more easily accomplished. It is to be understood that normally a convergence of all of the tunnel walls is particularly desirable where the tunnels are fixedly secured to the pot.

Figure 13:
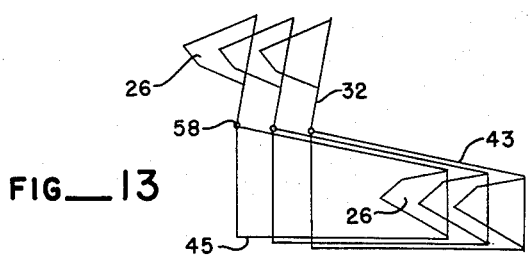
FIGURE 13 is a view on a reduced scale in a simplified form illustrating a secondary manner in which our traps can be nested where it may not be desirable to remove the door from the traps.

Having all walls of the tunnels converge toward the median of the tunnel makes it possible to have the secondary nesting, after the showing of FIGURE 13 and this form which may have other variations has been found to be a desirable arrangement under certain operational conditions.

For unloading the closure door 31 of the large end of the pot must be so arranged that it can be swung clear up above the upper frame member 18 in order that the trap can be unloaded after the showing in FIGURE 9 and to achieve the secondary nesting shown in FIGURE 13. This upper hinge needs a structure that will permit swinging through three quarters of a circle and such an arrangement is shown in FIGURES 5 and 6 wherein a short tube 56 is welded to frame 54 of the door or closure member 31 and a similar piece of tubing 57 is welded to the upper frame member 18 so as to provide two parallel tubes. The U-shaped metal rod 58 is provided to engage these two parallel tubular members 56 and 57 and thereby form a hinge that will have the operational characteristics required. In keeping with the desire to have all the structure simple, so that there will be the least possible tendency for it to get out of order, a friction locking arrangement is provided by the rubber band 60 which may be properly tensioned by the hook 62 secured thereto and which may engage the web of the pot 64. Reference is again made to FIGURE 9 which illustrates the dumping position of the pot which is achieved by having the lifting bridle 68 secured towards the small end of the pot from its longitudinal center. Consequently just the weight of the pot itself will produce the positioning shown in FIGURE 9 but this effect of course is increased when a load is in the trap. It is necessary to provide some easily openable lock for the closure door 31 and this is shown in the structure in FIGURES 11 and 12 wherein a locking bar 70 is provided, the body of which is horizontally disposed and is free to revolve within the tubular member 72. At one end is a normally horizontal bend 74; at the other end a vertically disposed bend portion 76 in each case assuming the locked position of the locking bar. Normally to provide against untimely opening, portion 76 should be longer than portion 74 so that by sheer weight the tendency will be to maintain the locked position even though considerable vibration or other strain may be placed on the locking means.

FIGURE 13 illustrates a modified form of structure or rather a modified use which is a particularly desirable form where it may be necessary to have a limited number of traps on the deck of the fishing boat. In view of the fact that the traps are often moved only a short distance it is not desirable to disassemble them by taking out the tunnels and the like so as to achieve maximum nesting. It is believed the showing of FIGURE 13 illustrates this structure and how it can be conveniently employed.

It is believed that it will be clearly apparent from the above description and the disclosure in the drawings that the invention comprehends a novel construction of a convertible and nesting commercial crab trap.

Having thus described our invention, we claim:

1. A convertible and nesting commercial crab trap comprising: a pot composed of a bottom frame, a top frame, side walls and end members; said top and bottom frames being substantially trapezoidal and wider at one end with respect to the opposing end; said bottom frame being substantially horizontal, said top frame sloping toward the narrower end of said pot forming a large end higher and wider than the opposing lower and narrower small end member; a plurality of struts connecting said top and bottom frames forming tapering side walls; said trapezoidal bottom frame, said sloping trapezoidal top frame and the inclined tapering walls forming a trap which is nestable in a similar trap to conserve space; a plurality of substantially diagonal bracing members reinforcing said top and bottom frames, side walls and end members; both end members having entrance tunnel openings; suitable mesh material secured to said top and bottom frames, side walls and end members exclusive of said entrance tunnel openings; said large end member having hinge and locking devices forming a closure door, and said small end member being fixedly secured; said entrance tunnel openings each being fitted with an entrance tunnel, said entrance tunnels having upwardly sloping mesh covered bottom surfaces, downwardly inclined mesh covered top surfaces and tapering inclined mesh covered side walls to facilitate nesting; said closure door hinge permitting a swing through substantially three quarters of a circle and disengageable to allow removal of said closure door; said hinge and locking devices including two spaced apart short pieces of tubing secured and parallel to the top of said closure door, two spaced apart short pieces of tubing secured and parallel to the top frame of said pot in juxtaposition to said tubing secured to said closure door, and U-shaped hinge pins having two parallel members disposed to engage said tubing members.

2. A convertible and nesting commercial crab trap comprising: a pot composed of a bottom frame, a top frame, side walls and end members; said top and bottom frames being substantially trapezoidal and wider at one end with respect to the opposing end; said bottom frame being substantially horizontal, said top frame sloping toward the narrower end of said pot forming a large end higher and wider than the opposing lower and narrower small end member; a plurality of struts connecting said top and bottom frames forming tapering side walls; said trapezoidal bottom frame, said sloping trapezoidal top frame and the inclined tapering walls forming a trap which is nestable in a similar trap to conserve space; a plurality of substantially diagonal bracing members reinforcing said top and bottom frames, side walls and end members; both end members having entrance tunnel openings; suitable mesh material secured to said top and bottom frames, side walls and end members exclusive of entrance tunnel openings; said large end member having hinge and locking devices forming a closure door, and said small end member being fixedly secured; said entrance tunnel openings each being fitted with an entrance tunnel, said entrance tunnels having upwardly sloping mesh covered bottom surfaces, downwardly inclined mesh covered top surfaces and tapering inclined mesh covered side walls to facilitate nesting; said closure door hinge including first tube means secured and generally parallel to the top of said closure door and second tube means secured and generally parallel to the top frame of said pot; and interconnected generally parallel pin means to engage said first and second tubing means.

References Cited by the Examiner

UNITED STATES PATENTS

| 527,606 | 10/94 | Hodge | 43—65 |
| 633,229 | 9/99 | Clark | 43—65 |
| 798,670 | 9/05 | Gee | 43—65 |
| 2,361,321 | 10/44 | Schleier | 43—65 |
| 2,516,658 | 7/50 | Stelly | 43—100 |

FOREIGN PATENTS

| 20,846 | 11/92 | Great Britain. |
| 1,142,188 | 9/57 | France. |

ABRAHAM G. STONE, *Primary Examiner.*